United States Patent [19]
Hermes

[11] 3,943,105
[45] Mar. 9, 1976

[54] PROCESS FOR TREATING DYED AND UNDYED POLYESTER MATERIALS WITH AN AGENT TO OVERCOME OR INHIBIT THE DESTRUCTIVE EFFECTS OF ULTRAVIOLET LIGHT

[75] Inventor: Julius Hermes, Martinsville, Va.

[73] Assignee: Martin Processing Company, Incorporated, Martinsville, Va.

[22] Filed: Dec. 7, 1971

[21] Appl. No.: 205,717

Related U.S. Application Data

[63] Continuation-in-part of Ser. No. 878,934, Nov. 21, 1969, abandoned, which is a continuation-in-part of Ser. No. 553,683, May 31, 1966, abandoned.

[52] U.S. Cl.... 260/47 C; 260/45.8 N; 260/45.95 G; 260/45.95 H; 260/63 R; 260/75 T
[51] Int. Cl.²......................................... C08G 63/70
[58] Field of Search 260/75 T, 47 C, 63 R, 45.95 G, 260/45.95 H, 45.8

[56] References Cited
UNITED STATES PATENTS

| | | | |
|---|---|---|---|
| 2,920,978 | 1/1960 | Randall | 403/309 |
| 3,211,729 | 10/1965 | Siegrist et al. | 260/248 |
| 3,389,004 | 6/1968 | Dressler | 106/176 |

*Primary Examiner*—Lester L. Lee
*Attorney, Agent, or Firm*—Stevens, Davis, Miller & Mosher

[57] ABSTRACT

A process for treating dyed and/or undyed polyester materials with an ultraviolet absorber to overcome or inhibit the destructive effects of ultraviolet light is disclosed. The polyester materials may be in the form of a film, yarn, textile products which are woven or non-woven. The process includes the steps of contacting or immersing the polyester material in either an undyed or dyed condition in a bath containing a non-volatile liquid polyhydric alcohol and an agent which is soluble in the polyhydric alcohol and compatible with the polyester material in effective concentrations such that effective amounts of the agent are incorporated into the polyester material together with the polyhydric alcohol to ensure substantially complete penetration of the agent in the polyester material and then removing excess bath solution by washing. The treated polyester material is then subjected to a heat treatment in which the absorbed polyhydric alcohol is removed by either vaporization or flashing from the polyester material whereby the absorbed treating agent remains in the polyester material to render the polyester material substantially stable to ultraviol light.

6 Claims, No Drawings

PROCESS FOR TREATING DYED AND UNDYED POLYESTER MATERIALS WITH AN AGENT TO OVERCOME OR INHIBIT THE DESTRUCTIVE EFFECTS OF ULTRAVIOLET LIGHT

CROSS REFERENCE TO RELATED APPLICATIONS

This application is a continuation-in-part application of Ser. No. 878,934 filed Nov. 21, 1969, now abandoned for "Method of Making Weatherable Polyester Material and Product Therefrom" which was a continuation-in-part application of our U.S. patent application Ser. No. 553,683 filed May 31, 1966, for "Method of Making Weatherable Polyester Material and Product Therefrom", now abandoned.

BACKGROUND OF THE INVENTION

This invention relates to a process for treating dyed and undyed polyester materials with an ultraviolet absorber agent to overcome or inhibit the destructive effects of ultraviolet light. The invention is more particularly directed to a process for intimately combining an ultraviolet light absorber with a polyester material so as to alter the structure of the polyester to inhibit or overcome the destructive effects of ultraviolet light. A bath containing a non-volatile liquid polyhydric alcohol and an effective amount of an ultraviolet light absorber which is compatible with polyester material is dissolved in the bath, the temperature of the bath being maintained in a temperature range of from 250° to 430°F. The polyester material is then contacted with the bath for a relatively short period of time of up to 30 seconds so that an effective amount of the ultraviolet light absorber, together with the polyhydric alcohol, is substantially uniformly dispersed throughout the polyester material. The polyester material is subsequently washed to remove excess bath from the surfaces of the polyester material and is then subjected to a heat treatment step of up to 15 seconds to remove any remaining polyhydric alcohol dispersed or entrapped in the polyester material.

Polyester material which are formed as a reaction product of poly basic acids and polyhydric alcohols are not, per se, resistant to ultraviolet light (see Randall U.S. Pat. No. 2,920,978, column 1, lines 50 through 56). The reaction product of terephthalic acid and ethylene glycol forms a synthetic material of polyethylene terephthalate which is commercially produced under the brand name of Dacron as a fiber or Mylar as a film and which undergoes degradation on exposure to sunlight unless means are taken to render the polyester material stable to the destructive effects of ultraviolet light.

Changes in the weather and long exposure to sunlight, in which ultraviolet rays are present deteriorate and embrittle polyester material, generally within one year or less. To overcome this problem, it has been known to coat polyester material with an ultraviolet light absorber with or without an adhesive binder, but preferably with an adhesive binder to prevent weathering, loss and leaching loss of the ultraviolet light absorber.

These prior art methods have proved unsatisfactory since cracks develop in the surface of the coating and apertures and perforations extend through the coating to form areas accessible to ultraviolet light to cause deterioration of the polymer and render the product unusable. Further, the coating method is suitable only on a base at least 5 mils in thickness, the process being impractical for the thinner gauges which are the most important commercial embodiments. Furthermore, where coating is employed as a method for applying the ultraviolet light absorber, any crack or opening formed in the coated material will provide a point of access for ultraviolet light which will then cause the polyester material to rapidly disintegrate due to the deterioration of the polymer chain and thereby render the product unusable. Also, where an adhesive is employed to bond two plastic members together or a plastic member to another member, the adhesive requires protection from ultraviolet light because without it it will discolor and also may break down and separate from the polyester material.

It has been known to employ ultraviolet light absorber of the benzophenone class which is described in U.S. Pat. No. 2,920,978 of Randall. However, when practicing the process of Randall it has been found that the polyester material has only limited periods of stability. Thus, when the benzophenones of Randall are treated or applied to a polyester material such as Dacron and allowed to weather, the treated material will discolor and eventually deteriorate due to ultraviolet light attack. This has been borne out wherein Dacron cloth becomes cracked and brittle after about 900 hours of exposure in a fadeometer test.

It was accidentally discovered that minute traces of the polyhydric alcohol remained in the film or in the cloth of polyester materials, even after washing at room temperature and drying at temperatures of about 212°F. Further, it had been found that becuase of the presence of the polyhydric alcohol in the treated polyester material certain processes could not be carried out, for example, the metal deposition on polyester film would not adhere thereto because of the presence of the polyhydric alcohol. Since the polyhydric alcohol will leach from the polyester material, it also carries with it small amounts of ultraviolet light absorber so that after a period of time when substantially all of the polyhydric alcohol has been removed from the film the film becomes brittle and will crack and deteriorate under attack by ultraviolet light. It has been found that by practicing the process of the invention herein treated dyed or undyed polyester materials with an ultraviolet light absorber intimately combined therewith will render the treated polyester material weatherable, stable and resistant to the destructive effects of ultraviolet light. The process comprises the steps of immersing the polyester material in an undyed or dyed condition in a bath containing a non-volatile liquid polyhydric alcohol and the bath containing an effective amount of an ultraviolet light absorber preferably of the benzophenone class or the benzotriazole class, the bath being maintained at a temperature of 250° to 430°F. so that when the polyester material is contacted with the treating bath liquid an effective amount of the polyhydric alcohol and ultraviolet light absorber will be intimately combined with the polyester material. Thereafter, the polyester material is washed to remove excess treating bath liquid from the surface of the polyester material and it is then subjected to a heat treatment step for a relatively short period of time, for example, 3 to 30 seconds at a temperature of from 350° to 450°F. to remove the excess polyhydric alcohol entrapped in the polyester material. Thus, by the removal of the excess polyhydric alcohol the treated polyester material is rendered ultraviolet light stable. It was unexpected that only the entrapped polyhydric alcohol would be removed from the treated polyester material and that the vaporized polyhydric alcohol did not carry any entrapped ultraviolet light absorber from that treated material during the heat treatment step.

SUMMARY OF THE INVENTION

It is an object of the present invention to provide an improved polyester textile material which is either dyed or undyed that has improved weatherable light resistant properties and which inhibits the destructive effects of ultraviolet light attack on the polyester material. It is another object of the invention to provide an improved weatherable light resistant polyester material and method of making the same which is substantially unaffected by ultraviolet radiation. It is still another object of the invention to provide a weatherable polyester material which is inexpensive to manufacture and for which existing machinery need not be altered for producing such material.

Unexpectedly, I have found that by employing an ultraviolet light absorber in a substantially non-volatile liquid polyhydric alcohol bath at a temperature of from about 250° to 430°F. and by quickly contacting the polyester material with the bath such that the contact time is less than about 30 seconds and preferably 2 to 3 seconds, the absorber, together with the non-volatile liquid polyhydric alcohol, uniformly penetrates the polyester material to intimately combine therewith, then excess bath solution is removed from the surfaces of the polyester material by washing the polyester material in an ambient temperature water bath. It had been found in the past that the treated polyester material would slowly lose the light absorber by a leaching process in which the non-volatile polyhydric alcohol would carry from the treated polyester material small amounts of light absorber due to a weathering action. Unexpectedly, the problem was overcome by subjecting the treated polyester material to a heat treatment step immediately after the polyester material had been washed. The heat treatment step is carried out at a temperature of from about 350° to 430°F. and preferably at 400° to 430°F. for a relatively short period of time to prevent softening of the polyester material or otherwise altering its physical characteristics. Such a treatment time is preferably in the range of from 3 to 30 seconds.

It is believed that the light absorber, when applied to polyester material with a carrier in accordance with the invention described herein, alters the structure of the polyester material so as to form a weatherable, light resistant polyester material. While I do not wish to be bound by theory, it is believed that this structural alteration is due to a chemical interaction between the polyester material and the light absorber. Further, the carrier plays no part in either the alteration of the polyester as evidenced by its complete removal during processing, or the fact that the polyester material still exhibits its other physical characteristics in addition to its light resistant properties.

Polyester material which has been treated in accordance with the invention herein with a light absorber is substantially unaffected by the destructive effect of ultraviolet light. Even where the polyester material has been creased or perforated with holes, the polyester does not exhibit any deterioration embrittlement degradation due to long exposure to ultraviolet light radiation and shows no signs of the destructive effect of ultraviolet light. The light absorber is present in the polyester material substantially homogeneously so that the entire polymer chain of the polyester material is resistant to attack by ultraviolet light. The light polyhydric alcohol carrier used does not vaporize during the application of the ultraviolet light absorber. The polyhydric alcohols used herein are substantially anhydrous, disperse or dissolve the ultraviolet light absorber, have a high boiling point and hold the evaporation of the bath to a minimum. Examples of polyhydric alcohols used herein are glycols, glycol ethers or polyglycols. Suitable glycols are ethylene, diethylene, propylene, dipropylene, butylene and glycerol. Although all of the aforementioned carrier materials are suitable, ethylene glycol is preferred for polyester films, such as Mylar, and diethylene glycol is preferred for polyester woven materials. The amount of absorber and carrier employed in forming the bath for treating polyester material may be varied. Although 2 to 25 grams or more of absorber per liter may be used, it is preferred that approximately 16 to 20 grams of absorber per liter be used in the bath for best weathering life.

The types of ultraviolet light absorbers that may be used as indicated above are those which are compatible with polyester material and which will dissolve or disperse uniformly in a polyhydric alcohol which is substantially non-volatile at the operating temperatures of the process herein. The light absorbers which have been found to work satisfactorily are the benzophenones such as 2,2 dihydroxy 4-4'-dimethoxy benzophenone, 2 hydroxy-4-aloxy benzophenone or mixtures of benzophenones, i.e. UVINUL 490 which are sold under the trademark UVINUL by the General Aniline and Film Corporation, also the benzotriazoles such as 2(2'-hydroxy-5-methyl-phenyl) benzotriazole which are sold under the tradename TINUVIN by the Geigy Chemical Corporation. In preparing the treatment bath an effective amount of the light absorber is dissolved or dispersed into the polyhydric alcohol such that upon contacting and/or immersing the polyester material in the bath a sufficient amount of absorber together with the polyhydric alcohol will substantially uniformly penetrate the polyester material so that upon subsequent removal of the polyhydric alcohols from the polyester material through the heat treatment step the polyester material will be rendered resistant to ultraviolet light. Generally the treatment bath will contain from about 2 to 25 grams of ultralight absorber per liter of polyhydric alcohol.

When the bath is heated to at least 250°F. the carrier and absorber will rapidly penetrate the polyester material. However, the solution should not be heated to or above the boiling point of the liquid carrier. If the polyester material is heated to a temperature in excess of 430°F. and thereafter contacted by the heated bath solution, the polyester will be damaged by the solvent action of the polyhydric alcohol contained in the bath. However, where the polyester is contacted by the bath solution by means of an applicator such that the bath solution is in excess of 430°F. but the polyester material is below this temperature, it will not be damaged.

The time required for reacting the polyester material with the bath containing the absorber and carrier may vary with regard to the temperature, concentration of the bath, mass of the polyester material, i.e. thickness of material or total denier, and the rate at which the polyester material is contacted or passed through the bath solution. It has been found that the polyester material need contact the bath for only a period of from 2 to 30 seconds to entrap an effective amount of ultraviolet light absorber in the polyester material to render it ultraviolet light resistant after it has been subjected to the heat treatment step.

After the material has been so treated and reacted with the absorber, the carrier must be completely removed by subjecting the treated polyester to a temperature in excess of the flash point of the carrier but below the melting point and deterioration point of the polyester material. While the boiling points of some of the carrier materials may be in excess of 430°F., their flash points are substantially below 430°F., as set forth in the following table:

|  | Boiling Point | Flash Point |
|---|---|---|
| Ethylene Glycol | 386°F. | 210°F. |
| Diethylene Glycol | 474°F. | 290°F. |
| Propylene Glycol | 370°F. | 210°F. |
| Glycerol | 554°F. | 350°F. |

Generally, the carrier, i.e. the polyhydric alcohol, is removed by passing a stream of air over heated elements, such as electrical heating coils, in which the air may attain a temperature in excess of 430°F., thereby obviating any damage thereto. The polyester material when subjected to the heat treatment step removes substantially and and all of the polyhydric alcohol remaining entrapped in the polyester material after the application of the absorber in the polyhydric alcohol bath to the polyester material.

The polyester material is subjected to the heat treatment step to remove substantially all of the carrier, the polyhydric alcohol which has penetrated the polyester material after it has been contacted with the treatment bath, with only the absorber remaining entrapped in intimate contact with the polyester material. In practice it has been found that the temperature of the heating zone may be maintained between about 350° to 450°F. without causing any damage to the polyester material.

The following examples are illustrative for making weatherable polyester material in accordance with the invention herein:

EXAMPLE I

A roll of polyester material in the form of a film sold under the Trademark Mylar, having a thickness of approximately 5 mils, is passed through a bath containing ethylene glycol as the carrier and Uvinul D-49, 2,2'-dihydroxy-4,4'-dimethoxy benzophenone, as the light absorber, in which the Uvinul is present in the amount of 16–18 gms. per liter of bath solution (16, 17 and 18 gms. per liter were used in three consecutive runs). The temperature of the bath is maintained at between 325° and 350°F. The film is continuously passed through the bath at a rate such that the surfaces of the film are contacted by the bath for a period of not more than 10 seconds. After the film has passed through the bath solution, it is quenched in a water bath at ambient temperature so as to remove the excess bath solution of absorber and carrier materials adhered to the surfaces of the film.

To facilitate removal of the liquid polyhydric alcohol carrier, the film from the Uvinul bath may be immersed in an organic solvent which is kept at room temperature, e.g. 15°–30°C., before it is sent to the quenching water bath, and solvents such as methyl ethyl ketone, acetone, ethyl alcohol, diethyl ketone and methanol have been successfully used to speed up the removal process.

Thereafter, the film is passed through a heating zone for a period of 10 seconds, maintained at a temperature of 400°–450°F. to evaporate substantially all of the entrapped carrier in the film. The heating zone may comprise several stages, a first stage at 350°–400°F. and a second stage at 400°–450°F. Different heating means may be used in each of the zones, e.g. the first zone may be heated by gas and the second by electrical resistance or radiation elements.

Thereafter, the film is wound on a take-up roll and is ready for immediate use or for shipment, storage and later use or subsequent treatment.

EXAMPLE 2

A woven polyester textile material, such as is suitable for use as a sail or awning, is passed through a bath as in Example I, except that the carrier material employed is diethylene glycol. After the textile material is passed through the bath, the material is passed through the nip of a pair of squeeze rollers to remove excess bath solution of absorber and carrier material adhered to the exterior of the material and is thereafter treated as in Example I.

The treated material of Example I was compared with an untreated polyester film from the same roll of material employing standard test procedures for determining weatherable characteristics. A sample of treated material and a sample of untreated material were placed in a weatherometer apparatus designed to test the weatherable characteristics of the film, e.g., to determine its resistance to ultraviolet light deterioration. In the weatherometer apparatus, both samples were subjected to intermittent ultraviolet light radiation. The treated polyester material was subjected to 2,000 hours of ultraviolet light radiation with no apparent disintegration, deterioration, embrittlement or the like. However, the untreated film became brittle and disintegrated after 900 hours exposure to ultraviolet light radiation. In a further test, samples of film as indicated above were placed in a fadeometer apparatus in which both samples were subjected to continuous ultraviolet light radiation. After 5,000 hours, the treated sample showed no signs of disintegration, deterioration, embrittlement or the like. However, after only 380–390 hours, the untreated film became brittle and disintegrated.

From the foregoing, it is apparent that the polyester material formed in accordance with the invention herein has been rendered resistant to light and weather. The film formed in Example I may be employed, for example, as a covering for greenhouses and display windows where ultraviolet light would cause damage to articles contained therein. The material of Example 2 may be used for sails, tents, awnings or other similar articles where the polyester material will be subjected to all varying types of weather conditions.

EXAMPLE 3

A roll of polyester material in the form of a film having a thickness of 5 mils was treated as in Example I except that the ultraviolet absorber, Uvinul D-49, was present in the amount of 20 grams per liter of ethylene glycol, the film was contacted with the treatment bath for 30 seconds at an average temperature of 330°F. After it was washed as in Example I it was subjected to heat treatment for 30 seconds at 300°F.

Tests were conducted on samples taken from the film before the heat treatment step and after the heat treatment step. The sample films before and after the heat treatment steps were placed over a dyed polyester fabric and both samples were simultaneously subjected to UV radiation in a Fade-O-Meter (carbon arc) for a period of 20 hours at 65% relative humidity at 110°F.

The dyed fabric covered with the treated film before the heat treatment step exhibited breaks in the fabric while the dyed fabric covered with the treated film after the heat treatment step showed no degradation or evidence of damage.

The same samples before and after the heat treatment step were subjected to UV radiation under the conditions indicated above were weighed before exposure to the UV radiation and after exposure to the UV radiation and also the percent relative UV radiation was measured. In the sample before the heat treatment step percent loss of weight of UV absorber was found to be 53.5% and the percent relative radiation was found to be 42.9% while the film subjected to the heat treatment step of the invention herein showed no UV radiation transmitted through the film and no loss in weight.

EXAMPLE 4

A roll of film was treated as in Example 3 except that the UV absorber used was Uvinul 490. The data obtained from identical tests of the treated film containing Uvinul 490 as described in Example 3 showed that the dyed fabric covered with the treated film before the heat treatment step exhibited significant degradation due to ultraviolet radiation after 20 hours of exposure under the conditions of Example 3 while the dyed fabric covered with the treated film after the heat treatment step exhibited no visible signs of degradation. Also, the percent weight loss after exposure of 20 hours on the film before the heat treatment step was found to be 60.8% with the percent relative UV radiation of 64.8%.

From the results of Examples 3 and 4 the data obtained clearly demonstrates that unless the treated polyester material is subjected to the heat treatment step of the invention herein degradation and loss of UV absorber occurs after only a relatively short period of time on exposure to conditions of a Fade-O-Meter as indicated in the examples. Also, the film treated in accordance with the invention herein remains stable and shows no visible signs of the destructive effect of UV radiation.

Weatherable, light-resistant polyester material may be employed for many other uses; for example, weatherable polyester film may be laminated to painted signs or painted exteriors of aircraft on which the paint used is sensitive to ultraviolet light radiation so as to extend the serviceable life thereof. For example, a sample color of International Orange as used for markings on airplanes will fade after 20 hours of exposure in a Fade-O-Meter. However, in a like sample where the painted surface is covered with a weatherable polyester film of 2 mils in thickness, only a slight fading occurs after 120 hours of exposure to the ultraviolet light radiation from the Fade-O-Meter apparatus. Also, where a sample of untreated Mylar, together with a sample of Mylar treated in accordance with the invention herein, both samples having a thickness of ½ mil, were exposed to the weather, after approximately 7 months, the untreated Mylar was completely destroyed by ultraviolet light deterioration; however, after two years, the treated Mylar still shows no sign of deterioration.

In another exposure test, polyester film of 500 mils thickness, sold under the trademark Mylar, was treated with a solution containing 18 gms. per liter of Uvinul D-49, 2,2'-dihydroxy-4,4'-dimethoxy benzophenone as the light absorber and diethylene glycol as the carrier under the conditions as set forth in Example I. The film thus treated is in use as a greenhouse covering in lieu of glass at St. James, Long Island, Hitherbrook Nursery. The film has been exposed continually to all weather conditions for 15 months in the period beginning March 1968 to November 1969, and at the present time, is still in use. During this period, the film has been subjected to all seasonal weather conditions, including abnormally heavy rainfall, snowfall and temperature extremes. No perceptible change has been noted in its light transmission characteristics, nor is there any evidence of discoloration or embrittlement.

A sample of film used as a control, which was untreated and exposed to outdoor weather conditions deteriorated and exhibited cracks and discoloration within about six months.

Weatherable polyester film may be laminated to other plastic material in which the plastic material is also subject to deterioration by ultraviolet light radiation and thereby extend the serviceable life of the plastic material.

It is apparent that many modifications may be made and many products may be made in accordance with the invention herein and a variety of products may be formed therefrom without departing from the spirit and scope of the invention as defined by the appended claims.

I claim:

1. A process for treating dyed or undyed polyester materials for rendering the same resistant to attack by ultraviolet light comprising; contacting the surface of the polyester material for a period of from 2 to 30 seconds with a heated bath maintained at a temperature of from 250° to 430°F. to heat the polyester material to a temperature of less than 430°F., said bath containing a non-volatile polyhydric alcohol as a carrier and an ultraviolet light absorber which is soluble in the polyhydric alcohol and compatible with the polyester material in effective concentrations such that effective amounts of the ultraviolet light absorber are incorporated into the polyester material together with polyhydric alcohol to ensure substantially complete penetration of the bath solution, washing the treated polyester material to remove excess bath solution from the surfaces of the polyester material in an aqueous solution at a temperature less than the treatment temperature; then subjecting the washed polyester material to heat so as to raise the temperature of the material to between 350° and 430°F. for a period of time of from 3 to 30 seconds to remove the remaining polyhydric alcohol entrapped in the polyester material whereby the ultraviolet absorber remains intimately combined with the heat treated polyester material to render it resistant to ultraviolet light.

2. The process of claim 1 wherein the polyhydric alcohol is selected from the group consisting of ethylene glycol, propylene glycol, dipropylene glycol, butylene glycol, glycerine, glycol ethers and polyglycols.

3. The process of claim 1 wherein -dimethoxy ultraviolet light absorber is 2,2'-dihydroxy-4,4'-dimethoxy benzophenone.

4. The process of claim 1 wherein the ultraviolet light absorber is 2-hydroxy-4-aloxy benzophenone.

5. The process of claim 1 wherein the ultraviolet light absorber is 2(2'hydroxy-5-methyl-phenyl) benzotriazole.

6. A method for rendering polyester material resistant to attack by ultraviolet light comprising:

contacting the surface of the polyester material for a period of 2 to 10 seconds with a heated bath matained at a temperature of 250°–430°F. to heat the polyester material to a temperature less than 430°F., said bath containing 2,2'-dihydroxy-4,4'-dimethoxy benzophenone as the effective ultraviolet light absorber and a substantially non-volatile liquid polyhydric alcohol as the carrier for said absorber, the polyhydric alcohol being selected from the group consisting of ethylene glycol, propylene glycol, dipropylene glycol, butylene glycol, glycerine, glycol ethers and polyglycols, to impregnate the polyester material;

washing the polyester material in water to remove excess bath material from the surface of the treated polyester material; and, then subjecting the washed polyester material to a heat treatment to raise the temperature of the material to between 350° and 430°F. for a period of time of from 3–15 seconds to remove the remaining polyhydric alcohol from the polyester material, whereby the ultraviolet light absorber remains intimately combined with the treated polyester material to render it resistant to ultraviolet light.

* * * * *

UNITED STATES PATENT AND TRADEMARK OFFICE
CERTIFICATE OF CORRECTION

PATENT NO. : 3,943,105

DATED : March 9, 1976

INVENTOR(S) : Julius HERMES

It is certified that error appears in the above-identified patent and that said Letters Patent is hereby corrected as shown below:

Column 9, line 2, in Claim 3, delete "-dimethoxy" and insert --the--.

Signed and Sealed this

Seventh Day of April, 1987

Attest:

DONALD J. QUIGG

Attesting Officer

Commissioner of Patents and Trademarks